United States Patent
Wasiq et al.

(10) Patent No.: US 9,954,852 B2
(45) Date of Patent: Apr. 24, 2018

(54) SERVICE-TO-SERVICE DIGITAL PATH TRACING

(71) Applicant: Amazon Technologies, Inc., Seattle, WA (US)

(72) Inventors: Muhammad Wasiq, Vancouver (CA); Nima Sharifi Mehr, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/420,011

(22) Filed: Jan. 30, 2017

(65) Prior Publication Data

US 2017/0142097 A1 May 18, 2017

Related U.S. Application Data

(62) Division of application No. 14/490,465, filed on Sep. 18, 2014, now Pat. No. 9,559,849.

(51) Int. Cl.
*H04L 29/06* (2006.01)

(52) U.S. Cl.
CPC ........ *H04L 63/0823* (2013.01); *H04L 63/123* (2013.01)

(58) Field of Classification Search
CPC ... H04L 9/3247; H04L 9/3263; H04L 9/3268; H04L 63/0823; H04L 63/123; H04L 63/1483; H04L 51/34; H04L 12/5885; H04L 29/08675; H04L 43/0817
See application file for complete search history.

(56) References Cited

U.S. PATENT DOCUMENTS

| | | | |
|---|---|---|---|
| 8,549,087 B2 | 10/2013 | Leonard | |
| 2003/0070080 A1 | 4/2003 | Rosen | |
| 2003/0074413 A1* | 4/2003 | Nielsen | H04L 45/00 709/206 |
| 2005/0198508 A1 | 9/2005 | Beck | |
| 2007/0277225 A1* | 11/2007 | Rits | G06F 21/606 726/2 |
| 2008/0112418 A1* | 5/2008 | Mehta | H04L 45/04 370/401 |
| 2008/0289039 A1 | 11/2008 | Rits et al. | |
| 2010/0121928 A1* | 5/2010 | Leonard | H04L 63/1433 709/206 |
| 2010/0185869 A1* | 7/2010 | Moore | H04L 9/3236 713/179 |
| 2011/0179046 A1 | 7/2011 | Paull et al. | |
| 2014/0189442 A1* | 7/2014 | DeGraaf | G06F 21/554 714/48 |

\* cited by examiner

*Primary Examiner* — Don Zhao
(74) *Attorney, Agent, or Firm* — Davis Wright Tremaine LLP

(57) ABSTRACT

A service receives from a sender service a digital message and a corresponding trace, which includes an ordered set of digital signatures of one or more services that participated in causing the service to receive the digital message. The trace may further specify an ordering of the one or more services, which may be generated according to the order of participation of these one or more services. The service may compare the received trace to recorded message paths to determine whether the ordering specified within the trace is valid. If the ordering is valid, the service may use one or more digital certificates to further verify the digital signatures included within the trace. If the service determines that these digital signatures are also valid, the service may process the message.

20 Claims, 9 Drawing Sheets

Service Data Repository Database

| Service ID | Known Message Paths | Observed Instances |
|---|---|---|
| Service B | I - H - G | 9,521,339 |
| | J - H - G | 2,547,221 |
| | M - L - K - G | 5,235 |
| Service C | D - E - F | 15,236,777 |
| | D - E - N | 3,710,059 |
| | T - S - R | 68,147 |
| Service D | W - V - C | 5,299,874 |
| | Z - Y - C | 5,691,775 |
| | R - P - Q | 1,236,598 |

FIG. 5

SERVICE-TO-SERVICE DIGITAL PATH TRACING

CROSS-REFERENCE TO RELATED APPLICATIONS

This application is a division of U.S. patent application Ser. No. 14/490,465, filed Sep. 18, 2014, entitled "SERVICE-TO-SERVICE DIGITAL PATH TRACING," the full disclosure of which is incorporated by reference for all purposes herein.

BACKGROUND

Service-to-service authentication is typically performed utilizing digital signatures. For instance, a service digitally may digitally sign a message using its private cryptographic key and transmit this message to a recipient service. The recipient service may utilize the sending service's public cryptographic key or digital certificate to verify the authenticity of the received message. However, inter-service interactions are not usually isolated but instead follow a certain path that may encompass multiple services. Particularly, a service may be able to validate that it is receiving an authentic message from another service but may not be able to validate that the message has followed a certain path before reaching the sending service. Similarly, the sending service may only be able to validate that it is receiving an authentic response from the recipient service but may not be able to validate the path beyond the recipient service used to deliver the response.

BRIEF DESCRIPTION OF THE DRAWINGS

Various embodiments in accordance with the present disclosure will be described with reference to the drawings, in which:

FIG. 5 shows an illustrative example of a repository database specifying one or more recorded message paths for one or more services in accordance with at least one embodiment;

DETAILED DESCRIPTION

Figure 1:
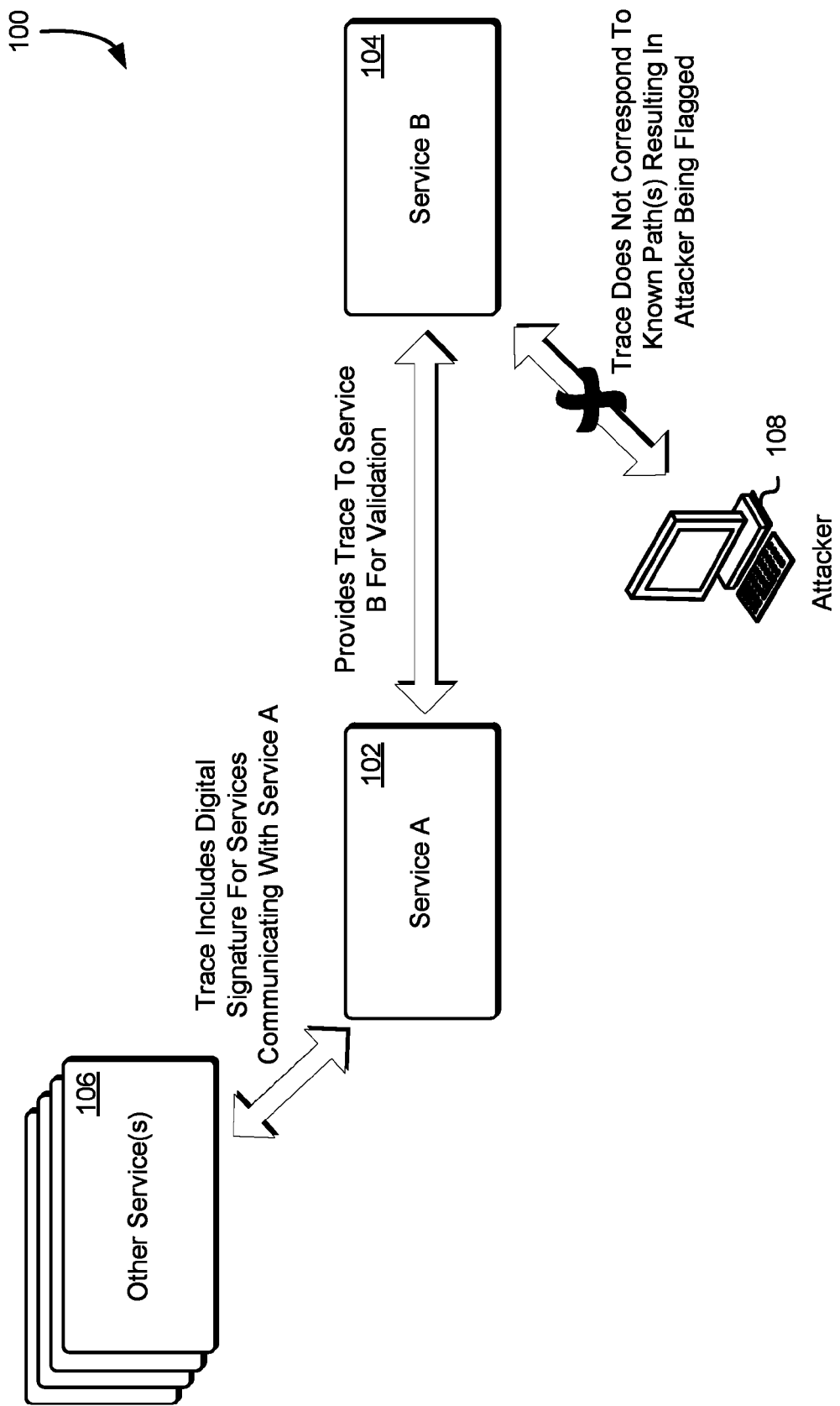
FIG. 1 shows an illustrative example of an environment in which various embodiments can be implemented.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to utilizing traces to digital messages to allow services along a message path to verify the complete path before the digital message reaches each service. In an embodiment, a recipient service receives a message from a sending service. The message may include a trace, which may be a concatenation of digital signatures that are added to the message by each service along a particular path. For instance, each service along the path may generate a digital signature based on the combination of its unique service identifier, a request identifier, and a timestamp. Thus, the trace may include the digital signature of the sending service and of other services along the particular path which the message has followed in order to reach the sending service. In some embodiments, the trace may further include a digital certificate for each service along the path. These digital certificates may be used to verify the digital signatures of each service.

When the recipient service receives the message and corresponding trace from the sending service, the recipient service may determine, by utilizing the trace, the possible communications paths which the message may have taken to reach the sending service. For instance, the recipient service may utilize machine learning techniques to identify various communications paths which messages may take to reach the sending service and, thereby, the recipient service. The recipient service may utilize these possible communications paths to determine whether the received message has followed any of these paths. If not, the recipient service may flag the sending service and perform certain security measures. However, if the specified path taken by the received message does correspond to a valid communications path, the recipient service may verify the digital signatures included with the trace to determine whether each digital signature is valid.

In an embodiment, the recipient service utilizes the digital certificate within the trace for each service along the path to verify the digital signature for each service. In an alternative embodiment, the recipient service obtains, from a certificate service, the digital certificates for each service along the particular message path. Each digital certificate may include a public cryptographic key usable to decrypt the corresponding digital signature, enabling the recipient service to determine whether the digital signature is valid. If the recipient service determines that any of the digital signatures included with the received trace are invalid, the recipient service may perform any security measures to address the anomaly. For instance, the recipient service may flag the received message and the sending server that has sent the message and corresponding trace as suspicious.

If the receiver service is able to verify the digital signatures included within the received trace, the recipient service may process the received message. For instance, the recipient service may transmit a response to the sending service. This response may also include a trace corresponding to each service through which the response has been processed to reach the recipient service. Similar to the process performed by the recipient service to verify the validity of the message received from the sending service, the sending service may verify each digital signature included within the trace included with the response received from the recipient service to determine whether the response is valid. If the response is not valid (e.g., any of the digital signatures included within the trace is invalid), the sending service may perform any security measures to address the anomaly.

In this manner, traces may be used to detect anomalies in service-to-service interactions, which may enable services to flag any suspicious services that have provided an improper trace. In addition, the techniques described herein facilitate additional technical advantages. For example, because, in some embodiments, a certificate service may be available to provide digital certificates for each service along a particular path on demand, the trace may not be required to include the digital certificates for each service that has digitally signed the message or response. This may reduce the size of each message or response for each service interaction.

FIG. 1 shows an illustrative example of an environment 100 in which various embodiments can be implemented. In the environment 100, a service 102 (e.g., Service A) may transmit one or more digital messages to a recipient service 104 (e.g., Service B). In some embodiments, the digital message may be digitally signed by one or more services. The service 102 and recipient service 104 may be computing resource services configured to provide customers of these services with particular computing resources to fulfill each customer's business needs. For instance, in some embodiments, the service 102 may transmit a request to the recipient service 104 to provision one or more virtual machine instances for use by a customer of the service 102.

Each of the one or more messages may include a trace, which may be used to verify the complete path of the one or more messages prior to reaching the recipient service 104. For instance, the trace may include a concatenation of digital signatures added by each other service 106 along the message path. For instance, in order to generate the message, other services 106 in addition to the service 102 may be required to perform particular tasks (e.g., customer verification, resource identification, etc.) to provide the recipient service 104 with sufficient data to appropriately respond to the received message. In some embodiments, the trace may be included within a HyperText Transfer Protocol (HTTP) header for HTTP transactions between a sending service 102 and the recipient service 104. The trace may include, for each service 102, 106 along the path, a digital signature corresponding to the service. The digital signature may include an encrypted hash of a service identifier, a request identifier and a timestamp. As each service 102, 106 generates its digital signature, the service may append this digital signature to the trace. In some embodiments, the trace may specify the set of services that participated in causing the message to be received by the recipient service and an ordering of this set of services. The ordering of the set of services may be organized according to an order of participation in causing the message to be received by the recipient service and the message being of a particular type. While digital signatures are used extensively throughout the present disclosure for the purpose of illustration, the trace may include other cryptographically verifiable information, such as ciphers or codes to replace plain text. In some embodiments, the trace may not include any digital signatures or other cryptographically verifiable information.

In an embodiment, each service 102, 106 along the message path further includes its digital certificate, which may include a public encryption key usable by the recipient service 104 to decrypt the digital signature to determine whether the digital signature is valid. In order to avoid a substantial increase in the message size due to additional digital signature/digital certificate pairs, each service 102, 106 along the message path may be configured to limit the length of the trace to a configurable number. For instance, if the length of the trace is configured to include a maximum number of digital signature/digital certificate pairs, a service 102, 106 may determine the number of digital signature/digital certificate pairs included within the trace and, if the number of pairs exceeds this maximum number, discard any digital signature/digital certificate pairs of any or all other earlier services 106 from the trace. It should be noted that the length of the trace need not be limited and, in some embodiments, may be unrestricted with regard to the number of digital signature/digital certificate pairs that may be included with the trace to the recipient service 104.

In an alternative embodiment, the digital certificate for each service 102, 106 along the message path may be maintained by a central certificate service, which may be configured to provide these digital certificates to the recipient service 104 on demand. For instance, when the recipient service 104 receives the message and the trace, the recipient service 104 may identify the one or more services 102, 106 along the message path and transmit a request to the certificate service to obtain the digital certificates corresponding to these one or more services 102, 106. Additionally, or alternatively, the recipient service 104 may locally cache digital certificates that it has received over time. This may obviate the need to transmit requests to a central certificate service to obtain digital certificates for each service 102, 106 along the message path as well as for these services 102, 106 to provide their digital certificates with the digital signatures included with the message. The recipient service 104 may refresh each digital certificate in the cache either when the digital certificate expires or when the digital signature signed by the particular digital certificate fails.

Once the sending service 102 has included, with the trace, its digital signature and has verified the digital signatures of the other services 106 along the message path, the sending service 102 may transmit the message with the appended trace to the recipient service 104. The recipient service 104 may determine, based at least in part on the specified message path included with the trace, whether the message may be analyzed further or rejected as anomalous to current recorded message paths. For instance, the recipient service 104 may utilize one or more machine learning techniques to define recorded message paths for messages received from a sending service 102. If the message path specified with the received trace does not correspond to any of these recorded message paths, the recipient service 104 may reject the message and perform one or more security measures. For instance, the recipient service 104 may flag the sending service 104 as being suspicious, which may prompt further investigation and actions by a security service, administrator or other assigned entity.

If the recipient service 104 is able to verify that the specified message path does correspond to a recorded message path, the recipient service 104 may obtain and utilize one or more digital certificates corresponding to each specified service 102, 106 along the message path to verify the digital signature for each of these services 102, 106. For instance, as noted above, the message may include the trace and the one or more digital certificates corresponding to the one or more services 102, 106 along the message path that may have appended the trace to include their digital signatures. Alternatively, the recipient service 104 may transmit a request to the certificate service to obtain the digital certificates for each of these services 102, 106. The recipient service 104 may utilize, for each digital signature, a corresponding public cryptographic key from the digital certificate to determine if the digital signature is valid. If the digital signature is not valid for any of the services 102, 106 along the message path, the recipient service 104 may reject the message and perform any security measures. However, if the digital signatures are valid, then the message may be processed by the recipient service 104 (e.g., transmit the message to a customer, generate a response to the received message, etc.).

As illustrated in FIG. 1, an attacker 108 (e.g., malicious user client, server, etc.) may utilize a comprised private cryptographic key for the sending service 102 to transmit one or more messages to the recipient service 104, while posing as the sending service 102. However, these messages from the attacker 108 may not include a proper trace. For instance, the recipient service 104 may be able to determine that a proper trace should specify that the message path includes the sending service 102 as well as myriad other services 106. Since the attacker 108 does not have access to the private cryptographic keys corresponding to these other services 106 along the message path, the attacker 108 may be unable to generate a valid trace (e.g., cannot provide the digital signatures for all services 102, 106 along a message path). As a result, the recipient service 104 may be able to detect this anomaly by examining the trace (e.g., discovering, from the trace, that the only valid digital signature corresponds to the sending service 102).

As a result of the recipient service 104 detecting that the trace obtained from the attacker 108 is not valid, the recipient service 104 may perform one or more security measures to address the incursion. For instance, the recipient service 104 may flag the Internet Protocol (IP) address of the attacker 108 and provide this IP address to a security service, which may take additional measures to prevent further messages from the attacker 108. For example, by flagging the attacker 108 as suspicious, the recipient service 104 may be configured, by a security service or administrator, to block any communications emanating from the attacker's 108 IP address. It should be noted that any security measures against a particular attacker 108 may be performed and these security measures may be determined based at least in part on the type of actions performed by this attacker 108.

Figure 2:
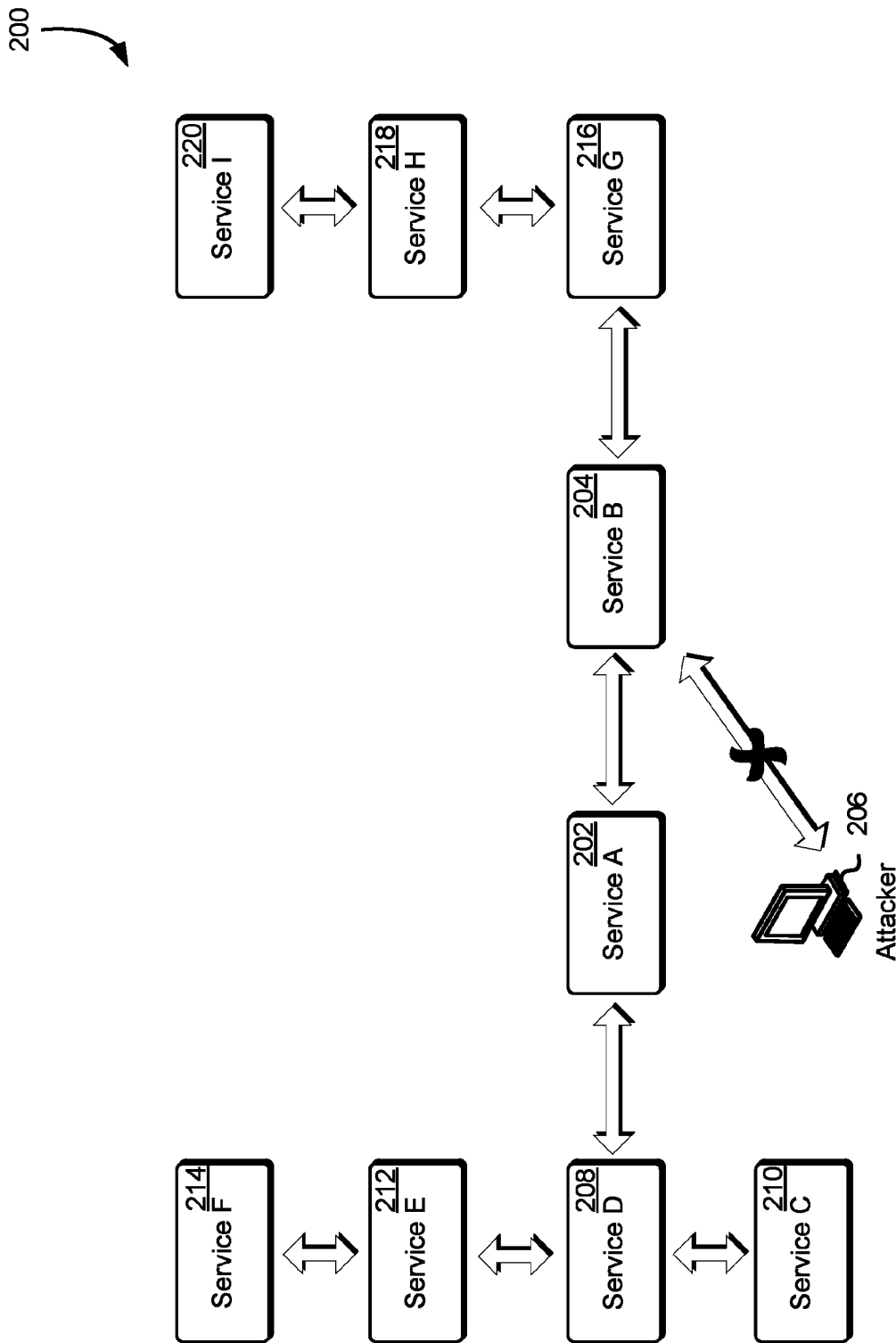
FIG. 2 shows an illustrative example of an environment in which a pre-trace path and post-trace path is used to detect any security anomalies in accordance with at least one embodiment.

As noted above, a sending service may provide a recipient service, in addition to a message, a trace, which may be used by the recipient service to validate one or more digital signatures for one or more services along the message path. Further, in response to the message, the recipient service may provide the sending service with a trace, in addition to a response, based at least in part on the received message. This trace from the recipient service may include the digital signature for each service along the response path. Accordingly, FIG. 2 shows an illustrative example of an environment 200 in which a pre-trace (e.g., message) path and post-trace (e.g., response) path is used to detect any security anomalies in accordance with at least one embodiment.

In the environment 200, a sending service 202 (e.g., Service A) may be directly connected with a recipient service 204 (e.g., Service B). As illustrated in FIG. 2, from the vantage point of Service A 202, there may be two different traces. For instance, Service A 202 may have one or more pre-trace paths, which a message may follow before it reaches Service A 202. For instance, in this illustrative example, Service A 202 may have two pre-trace paths. The first pre-trace path may cause a message to follow the path from Service F 214 to Service E 212 and to Service D 208 before reaching Service A 202. The second pre-trace path may cause the message to follow the path from Service C 210 and to Service D 208 before reaching Service A 202. In addition to the one or more pre-trace paths, Service A 202 may also have one or more post-trace paths, which a message may follow after it is transmitted from Service A 202 to the recipient service, in this case Service B 204. Alternatively, the post-trace path may be defined as a path which a response to the message may follow before reaching Service A 202. For example, as illustrated in FIG. 2, the single post-trace path may cause a response to follow the path from Service I 220 to Service H 218 and to Service G 216 before reaching the recipient service, Service B 204.

In an embodiment, a first request is sent from one service to another service, which causes the other service to send a second (e.g., different) request to a third service along a message path until a final message reaches the recipient service. For instance, in this illustrative example, Service F 214 may send a first request and a trace including the digital signature and digital certificate of Service F 214 to Service E 212 along the pre-trace path. Service E 212, in response to receiving this first request and trace, may process the request and append its digital signature and, in some instances, the corresponding digital certificate for Service E 212 to the trace. Accordingly, each service along the pre-trace path may cause the message to be received by a later service along the trace path.

As defined above, a trace may be a concatenation of digital signatures added by each service along a message/response path. Each service along a particular message/response path may generate a digital signature on the combination of its identifier, a message/response identifier, and current timestamp. Once the digital signature has been generated, each service may append this digital signature to the trace. For example, the trace provided by Service A 202 to Service B 204 may include the digital signatures of Service F 214, Service E 212, Service D 208, and Service A 202 (if following the first pre-trace path) or of Service C 210, Service D 208 and Service A 202 (if following the second pre-trace path). A particular trace specifying a pre-trace path for Service A 202 may be modeled according to the example below.

Pre-Trace$_A$=(ServiceID=F, Timestamp=80, RequestID=A1B2C3D)$_{Key\_F}$|(ServiceID=E, Timestamp=90, RequestID=E1F2G3H)$_{Key\_E}$|(ServiceID=D, Timestamp=100, RequestID=G1H2I3J)$_{Key\_D}$|(ServiceID=A, Timestamp=110, RequestID=K1L2M3N)$_{Key\_A}$ Similarly, the trace from Service B 204 to Service A 202 may include the digital signatures of Service I 220, Service H 218, Service G 216 and Service B 204 (the post-trace path). For instance, the trace specifying the post-trace path for Service B 204 may be modeled according to the example below.

Post-Trace$_B$=(ServiceID=I, Timestamp=80, RequestID=A1B2C3D)$_{Key\_I}$|(ServiceID=H, Timestamp=90, RequestID=E1F2G3H)$_{Key\_H}$|(ServiceID=G, Timestamp=100, RequestID=G1H2I3J)$_{Key\_G}$|(ServiceID=B, Timestamp=110, RequestID=K1L2M3N)$_{Key\_B}$ In an embodiment, each service along a particular pre-trace path or post-trace path may add a digital certificate corresponding to its digital signature to the trace. Each digital certificate may include a public cryptographic key, which may be used by the service receiving the message/response to determine the validity of the corresponding digital signature. For instance, the message and trace provided to Service B 204 by Service A 202 may include the digital certificates for Service F 214, Service E 212, Service D 208, and/or Service C 210, depending on the particular pre-trace path the message has gone through.

In order to reduce the size of messages sent from service to service, each service may be configured to identify if the received trace exceeds a specified length limit. For instance, if the length limit is defined to include only three digital certificates, each service may ensure that the trace that is constructed only has the last two services before it by discarding the digital signatures and certificates of all other earlier services from the trace. For example, using the example illustrated in FIG. 2, if the length limit is defined to include only three digital certificates, Service A 202, prior to delivering the message and trace to Service B 204, may discard, from the trace, the digital signature and certificate for Service F 214, if the message follows the first pre-trace path. This may result in a trace that includes the digital signatures and certificates for Service E 212, Service D 208, and Service A 202, which may satisfy the length limit defined for each service. Alternatively, if the message travels through the second pre-trace path, no digital signatures or certificates may need to be discarded since the trace may include the digital signatures and certificates for Service C 210, Service D 208, and Service A 202, satisfying the defined length limit of the trace.

In an alternative embodiment, a central certificate service (not shown) may provide the digital certificates for each service on demand. For instance, when Service B 204 receives the message and trace from Service A 202, Service B 204 may transmit a request to the central certificate service to obtain the digital certificate for each service along a specified pre-trace path. Following this approach may obviate the need for trace length limits as the trace may no longer require a digital certificate for each of the services along a pre-trace or post-trace path. Additionally, or alternatively, a service may locally cache all digital certificates that it has received over time. For instance, when Service B 204 receives the digital certificates for Service F 214, Service E 212, Service D 208, and Service A 202 with the message and trace from Service A 202, Service B 204 may add these digital certificates to its cache once the digital signatures included with the trace are validated.

A service that maintains one or more digital certificates within its cache may refresh these one or more digital certificates either when the one or more digital certificates expire or when a digital signature signed by a particular digital certificate fails. As an alternative to digital certificate expiration, a service may be configured to refresh these one or more digital certificates after a particular period of time. For example, a service may refresh the digital certificates within the cache after a number of days, at which time the service may transmit a request to the certificate service to obtain a new digital certificate for each service it has interacted with. When a digital signature signed by a particular digital certificate fails, the service may communicate with the certificate service to obtain a new digital certificate that may correspond to the digital signature triggering the failed response. Once the service obtains this new digital certificate, the service may again attempt to validate the digital signature using the public cryptographic key obtained from the new digital certificate.

Once the service has obtained the digital certificate for each service along the pre-trace/post-trace message path, the service may utilize these digital certificates to determine whether the trace is valid. For instance, to validate the post-trace path of Service B 204, Service A 202 may require the digital certificates for each of Service I 220, Service H 218, Service G 216, and Service B 204. The digital certificates for each these services may either be included with the trace or obtained through a request to the aforementioned certificate service. If one or more of the digital signatures are invalid or the pre-trace/post-trace path does not correspond to recorded paths, the service may reject the message/response and perform one or more security measures. For instance, if Service A 202 determines that any of the digital signatures for Service I 220, Service H 218, Service G 216, or Service B 204 is invalid, Service A 202 may flag Service B 204. This may cause an administrator or security service to further investigate Service B 204 to determine the cause of the anomaly. However, if the digital signatures are indeed valid, the service may process the received message/response.

As illustrated in FIG. 2, an attacker 206 may have compromised the private cryptographic key of Service A 202, which may enable the attacker 206 to send spoofed requests to Service B 204 while posing as Service A 202. However, the message from the attacker 206 may not include a proper trace, since the attacker 206 may not have access to the digital signatures of the services included in any of the pre-trace paths. This may enable Service B 204 to detect one or more anomalies with regard to the messages transmitted from the attacker 206 utilizing Service A's 202 private cryptographic key. Thus, Service B 204 may be able to flag the attacker 206 as being suspicious and perform one or more security measures. For instance, Service B 204 may cause the IP address associated with the attacker 206 to be blocked, such that no further communications from the attacker 206 may be received. Alternatively, the attacker 206 may continue communications with Service B 204 in a sandboxed environment, wherein these communications may be closely monitored in order to obtain necessary security data for dealing with such attacks.

Figure 3:
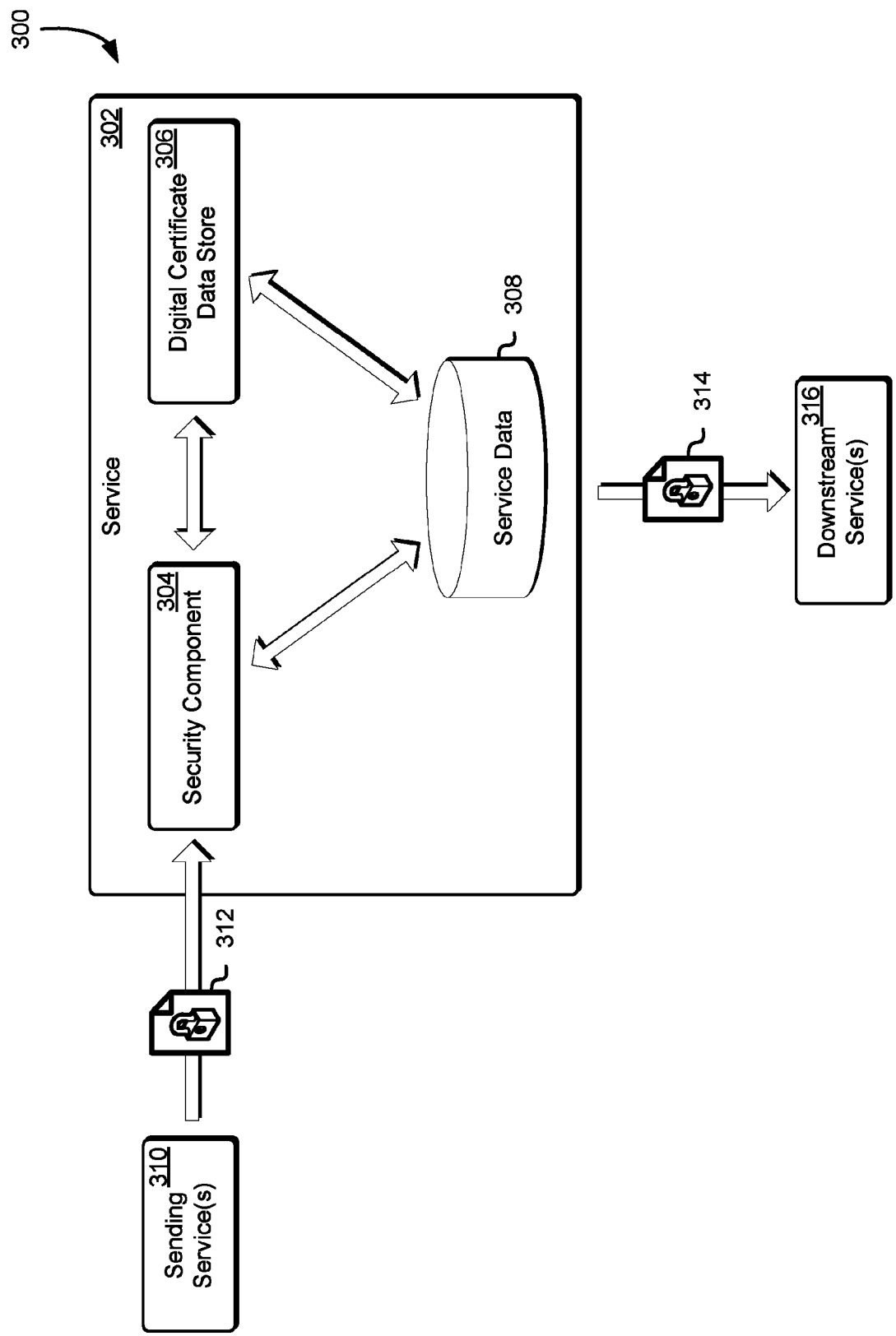
FIG. 3 shows an illustrative example of an environment in which a service utilizes one or more digital certificates included within a digital message for each service along a path to validate the digital message in accordance with at least one embodiment.

As noted above, each service involved in service-to-service interactions may be configured to evaluate pre-trace and post-trace paths to determine whether a message received from another service may be trusted. For instance, a service may receive a message from another service, as well as a trace, which may include the digital signatures of each service along a pre-trace or post-trace path through which the message has been sent. The service may utilize one or more digital certificates to verify each of these digital signatures and thereby validate the trace. These digital certificates may be included with the trace. Accordingly, FIG. 3 shows an illustrative example of an environment 300 in which a service 302 utilizes one or more digital certificates included within a digital message for each service 310 along a path to validate the digital message in accordance with at least one embodiment.

In the environment 300, one or more sending services 310 may transmit, to a service 302, a digital message 312 that includes a trace and one or more digital certificates. The trace may include the digital signature of each sending service 310 along the pre-trace path through which the digital message 312 has been sent. The digital message 312 may be received by a security component 304 of the service 302, which may be configured to determine whether the trace path included with the digital message 312 is valid or not. For instance, the security component 304 may first identify the particular pre-trace path through which the digital message 312 has been sent to reach the service 302. In order to determine whether the pre-trace path is valid, the security component 304 may access a service data repository 308, which may specify one or more valid pre-trace paths corresponding to the most recent sending service 310 that has transmitted the digital message 312 to the service 302.

The service data repository 308 may be populated utilizing one or more machine learning techniques. For instance, the service 302 may record, within a database, all pre-trace and post-trace paths that the service 302 may have observed (i.e., recorded) through processing of one or more digital messages 312 and corresponding traces over time. The service 302 may utilize one or more algorithms to identify any trends with regard to these pre-trace and post-trace paths and predict particular paths based at least in part on the sending service 310 transmitting the digital message 312 and corresponding trace to the service 302. Alternatively, an administrator may populate the service data repository 308 to specify the pre-trace and post-trace paths for each sending service 310 and downstream service 316 which may communicate with the service 302.

If the security component 304 determines that the pre-trace path through which the digital message 312 has been sent does not correspond to any pre-trace paths specified within the service data repository 308, the security component 304 may deem the digital message 312 and the sending service 310 to be suspicious and, in turn, perform one or more security measures. For instance, the security component 304 may reject the digital message 312 and log the IP address of the sending service 310. This may enable the security component 304 to block any incoming transmissions from this IP address and/or notify an administrator or security service of a potential security issue.

Alternatively, if the security component 304 is able to determine that the pre-trace path through which the digital message 312 has been sent is specified within the service data repository 308, the security component 304 may utilize the one or more digital certificates included within the trace to verify the trace. As noted above, the trace may include, for each sending service 310, a digital signature. The corresponding digital certificate, which may include a public cryptographic key, may be used to validate the digital signature. Thus, the security component 304 may utilize these digital certificates to validate each of the digital signatures included within the trace. If any of the digital signatures is deemed to be invalid, the security component 304 may flag the sending service 310 that transmitted the digital message 312 to the service 302 and perform one or more security measures, as described above.

Once the security component 304 has utilized the one or more digital certificates to validate the trace and, by extension, the digital message 312, the security component 304 may store these digital certificates within a digital certificate data store 306, such that the service 302 may be able to verify one or more digital signatures associated with a trace without need for the security component 304 to extract the digital certificates from the received digital message 312. Additionally, if the digital message 312 is to be sent to one or more downstream services 316, the security component 304 may append the trace to include the digital signature of the service 302 and may access the digital certificate data store 306 to further include, within the appended trace to be sent with the new digital message 314, the digital certificate for the service 302. Once the trace to be sent with the new digital message 314 includes the digital signature and corresponding digital certificate of the service 302, the service 302 may transmit the new digital message 314 and appended trace to any downstream services 316. These downstream services 316 may perform similar procedures to those described above to verify the validity of the trace included with the new digital message 314.

Figure 4:
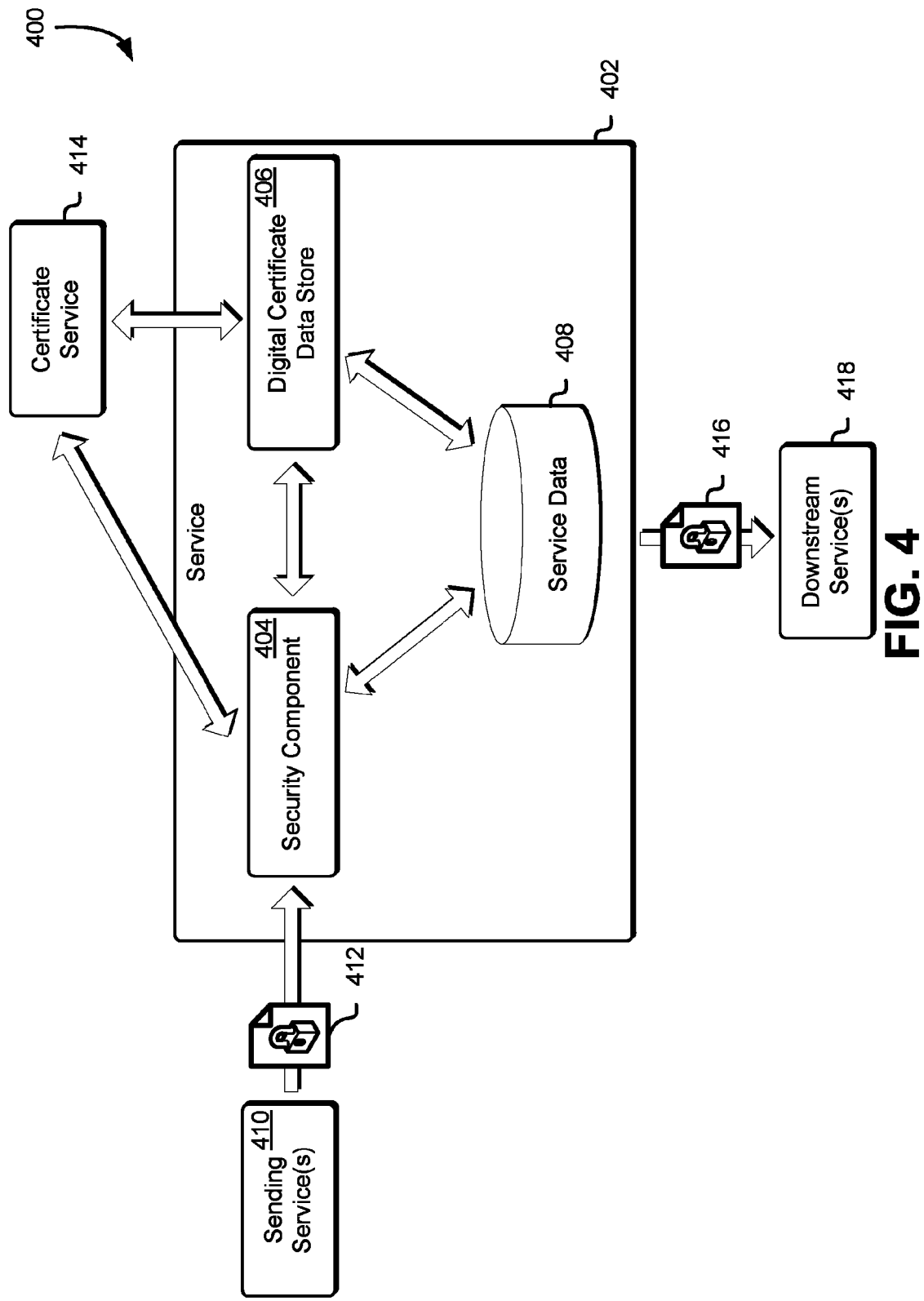
FIG. 4 shows an illustrative example of an environment in which a service obtains one or more digital certificates from a certificate service to validate a digital message and a trace comprising digital signatures for each service along a particular path in accordance with at least one embodiment.

As noted above, a service may obtain, from a certificate service, one or more digital certificates, which may be used to verify a trace obtained from one or more sending services. These one or more digital certificates may be stored within a service cache or digital certificate data store, wherein these digital certificates may be used to validate each digital signature included with the trace. Accordingly, FIG. 4 shows an illustrative example of an environment 400 in which a service 402 obtains one or more digital certificates from a certificate service 414 to validate a digital message 412 and a trace comprising digital signatures for each service 410 along a particular path in accordance with at least one embodiment. The service 402 may include similar components to those described above in connection with FIG. 3. For instance, the service 402 may include a security component 404, which may utilize a service data repository 408 to identify valid pre-trace/post-trace paths and a digital certificate data store 406 which may be used to store one or more digital certificates into cache. Additionally, the digital certificate data store 406 may include a database specifying one or more trusted certificate authorities for each of the one or more digital certificates stored in cache. Thus, the service 402, through this database, may be able to not only identify whether the trace is valid, but also that each digital signature is certified by a trusted certificate authority.

In an embodiment, each trace includes one or more digital signatures corresponding to each sending service 410 along a pre-trace path through which the digital message 412 is transmitted. As opposed to the traces described above in connection with FIG. 3, the trace corresponding to the digital message 412 may not include one or more digital certificates corresponding to the digital signatures concatenated within the trace. Thus, when the security component 404 of the service 402 receives the digital message 412 and corresponding trace from the sending service 410, the security component 404 may access a digital certificate data store 406 to determine if the digital certificates necessary to validate each of the digital signatures included with the trace are stored in cache. If not, the security component 404 may transmit a request to a certificate service 414 to obtain the one or more necessary digital certificates. The certificate service 414 may transmit the requested one or more digital certificates to the digital certificate data store 406, where the digital certificates may be stored.

The security component 404 may access the digital certificate data store 406 to obtain the one or more digital certificates that may correspond to the one or more digital signatures of the sending services 410 along the pre-trace path through which the digital message 412 has been sent. If utilizing the one or more digital certificates demonstrates that any of the digital signatures are invalid, the security component 404 may transmit an additional request to the certificate service 414 to ensure that the one or more digital certificates stored within the digital certificate data store 406 are up-to-date. For instance, if the digital certificate data store 406 includes one or more expired digital certificates, the certificate service 414, in response to the request from the security component 404, may transmit one or more updated digital certificates to the digital certificate data store 406. This may enable the security component 404 to utilize these one or more updated digital certificates to determine whether the previously identified invalid digital signatures are still invalid. If so, the security component 404 may flag the sending service 410 and perform one or more security measures.

If the digital signatures included within the trace are valid, the security component 404 may append the trace to include the digital signature of the service 402. Once the appended trace corresponding to the new digital message 416 includes the digital signature of the service 402, the service 402 may transmit the new digital message 416 and the appended trace to any downstream services 418. These downstream services 418 may also be configured to access the certificate service 414 to obtain the digital certificate corresponding to the digital signature provided by the service 402 in order to validate this digital signature.

As noted above, the service data repository within each service may include a database, which may specify all pre-trace and post-trace paths that the service may have observed (i.e., recorded) through processing of one or more digital messages and corresponding traces over time. The service may utilize one or more algorithms to identify any trends with regard to these pre-trace and post-trace paths and predict particular paths based at least in part on the sending service transmitting the digital message and corresponding trace to the service. For instance, the service may calculate a confidence score for each pre-trace and post-trace path for each sending service based at least in part on the population of a group that includes the pre-trace and post-trace path for the sending service. Accordingly, FIG. 5 shows an illustrative example of a repository database 500 specifying one or more recorded message paths for one or more services in accordance with at least one embodiment. When the security component of a service accesses the service data repository database 500 to determine whether a pre-trace or post-trace path is specified therein. If the particular trace for a service does not specify a particular pre-trace or post-trace path specified within the database 500, the security component may perform one or more security measures, as the particular trace may be suspect.

For instance, when the security component of a service receives a trace from a sending service, the security component may attempt to identify a sending service entry within a service column 502 for the particular sending service. The service column 502 may specify one or more sending services that may have transmitted one or more messages to the service over a particular period of time. The service data repository database 500 may further include a recorded message path column 504, which may be used to specify one or more recorded message paths for each sending service specified within the service column 502.

In order to populate the recorded message path column 504 for sending service, the service may utilize the one or more message logs to identify each pre-trace path or post-trace path observed over a particular period of time. As each path is identified, the service may populate the recorded message path column 504 for each sending service specified within the one or more message logs. While each sending service specified within FIG. 5 has three corresponding recorded message paths specified within the recorded message path column 504, it should be noted that the number of message paths that may be specified for each sending service may vary. For instance, a popular sending service may correspond to more message paths than less popular sending services.

For each sending service of a set of sending services, the security component of the receiving service may track each observed instance of the pre-trace or post-trace path specified in the received trace in order to determine a confidence score. This confidence score may be used to determine whether a particular message path provided by a sending service is valid or not. For instance, the security component of the receiving service may access the one or more message logs and, for each message path for a particular sending service, track each instance specified within the one or more message logs. This information may be used to populate an observed instances column 506 within the service data repository database 500. The observed instances column 506 may include a tally for each time a message path is observed for a particular sending service within one or more message logs. The tally may be cumulative over the entire analytical period in which the security component has reviewed the message logs or may correspond to the number of observed instances over a particular period of time. Once the security component has determined the number of observed instances for each message path of a sending service, the network security service may determine a confidence score for each message path corresponding to each sending service. This may enable the security component to determine whether a particular message path specified in a trace is valid or not.

Figure 6:
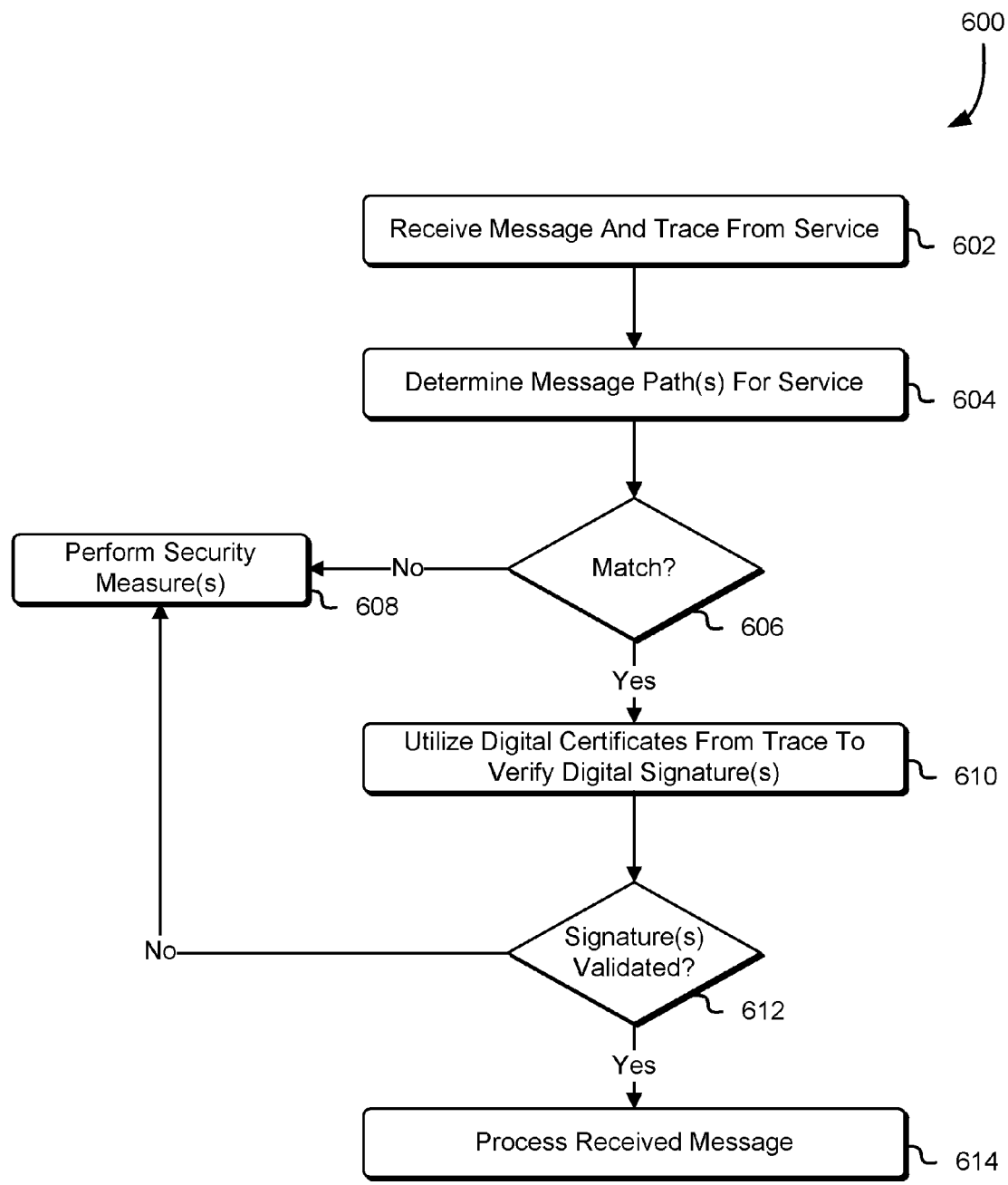
FIG. 6 shows an illustrative example of a process for validating a message by utilizing one or more digital certificates included with a trace corresponding to the message in accordance with at least one embodiment.

As noted above, a service receiving a message and corresponding trace from another service may utilize one or more digital certificates included with the trace to verify the complete path which the message has gone through to reach the service. For instance, in some embodiments, the service may utilize these one or more digital certificates to validate one or more digital signatures corresponding to each service along the message path. If any of the digital signatures cannot be validated, then the service may flag the sending service and the message as suspicious and perform one or more security measures. Accordingly, FIG. 6 shows an illustrative example of a process 600 for validating a message by utilizing one or more digital certificates included with a trace corresponding to the message in accordance with at least one embodiment. The process 600 may be performed by a recipient service, which may receive one or more messages and corresponding traces from other services. Further, the recipient service may be configured to utilize one or more digital certificates to validate one or more digital signatures included with the received traces to verify the complete path the message has gone through.

The recipient service, at any point, may receive 602 a message and corresponding trace from a sending service. As defined above, a trace may be a concatenation of digital signatures added by each service along the message path. For instance, as each service along the message path interacts with the message, each service may append the trace to include its own digital signature. Additionally, in an embodiment, each service also includes, within the trace, a digital certificate, which may include a public cryptographic key usable to verify the authenticity of the digital signature provided by the service and appended to the trace. The message and/or trace may also include metadata, which may specify the message path through which the message has gone through to reach the recipient service. For instance, this metadata may specify the identity of each service along the message path that has interacted with the message. Further, the metadata may specify an ordering of digital signatures that can serve as an indication of the order in which the services may participate within the message path.

Once the recipient service has received the message and corresponding trace from the sending service, the recipient service may determine 604 the one or more acceptable communications paths for the sending service. For instance, the recipient service may utilize one or more machine learning techniques to identify acceptable message paths related to the sending service. For example, an administrator of the service may seed the machine learning algorithms by manually entering information about particular message paths that have been deemed to be acceptable. In another example, the service may tally each observed message path for a variety of received messages. This tally may decay over time such that older message paths may lose their particular tally as, over time, these older message paths are not observed. The service may establish a particular threshold for the tally such that any observed message path that falls below this threshold may be flagged and/or audited. Further, the service may specify one or more messages that are inherently unacceptable and are to be rejected automatically. These machine learning techniques may also receive feedback from the service or other entity (e.g., administrator) to update a model that scores certain message paths. For instance, the machine learning techniques may enable the service to utilize the model to identify commonalties among rejected message paths. Based at least in part on these commonalties, the service may be able to identify any message paths that match these previously rejected message paths and reject these message paths outright. In an alternative embodiment, as the recipient service receives more messages from one or more sending services, the recipient service records the associated message path to a database, which may be used to track the incidence for each observed message path. Based at least in part on these observed message path incidences, the recipient service may utilize one or more algorithms to develop a confidence score for each message path for a particular sending service.

Alternatively, the one or more acceptable communications paths for the sending service may be defined by an administrator or security service. For instance, an administrator of one or more services may have an understanding of the possible service-to-service interactions within a network environment, which may be used to define possible message paths for each particular sending service. This may enable the administrator to generate a database specifying each possible message path for each sending service within the network. This database may be stored within a service data repository of the recipient service, as illustrated in FIGS. 3 and 4. The recipient service may thus access this service data repository to access the database and determine 604 the one or more acceptable message paths for the sending service.

The recipient service may utilize these determined message paths for the sending service to determine 606 whether the message path specified within the trace metadata matches any of these determined message paths. If there is no match, the recipient service may perform 608 one or more security measures. For instance, the recipient service may flag the received message and the sending service as suspicious. This may alert an administrator or security service to further investigate the received message and the sending service to determine the nature of the anomaly. Additionally, or alternatively, the recipient service may block the IP address of the sending service to prevent further message transmissions from the sending service to the recipient service. It should be noted that myriad security measures may be performed dependent on the configuration of the recipient service.

If the message path specified within the trace metadata does correspond to a determined message path for the sending service, the recipient service may utilize 610 the one or more digital certificates included with the trace to verify the digital signatures for each service included within the received trace. Each digital certificate may include a public cryptographic key, which may be used to decrypt a corresponding digital signature to determine the validity of the digital signature. In this manner, the recipient service may be able to determine 612 whether each of the digital signatures included within the trace are valid.

If any of the received digital signatures are not valid, the recipient service may perform 608 one or more security measures, as the received message and the sending service may be deemed to be suspicious. The one or more security measures that may be performed may be similar to the ones described above that may be performed in response to determining that the communications path and the message path specified within the metadata of the message do not match. However, if the digital signatures included with the trace are deemed to be valid, the recipient service may process 614 the received message. For instance, the recipient service may transmit a response to the sending service. Alternatively, the recipient service may append the trace to include its own digital signature and corresponding digital certificate. Subsequently, the recipient service may transmit the newly modified message to another recipient service, which may perform the process 600 locally.

Figure 7:
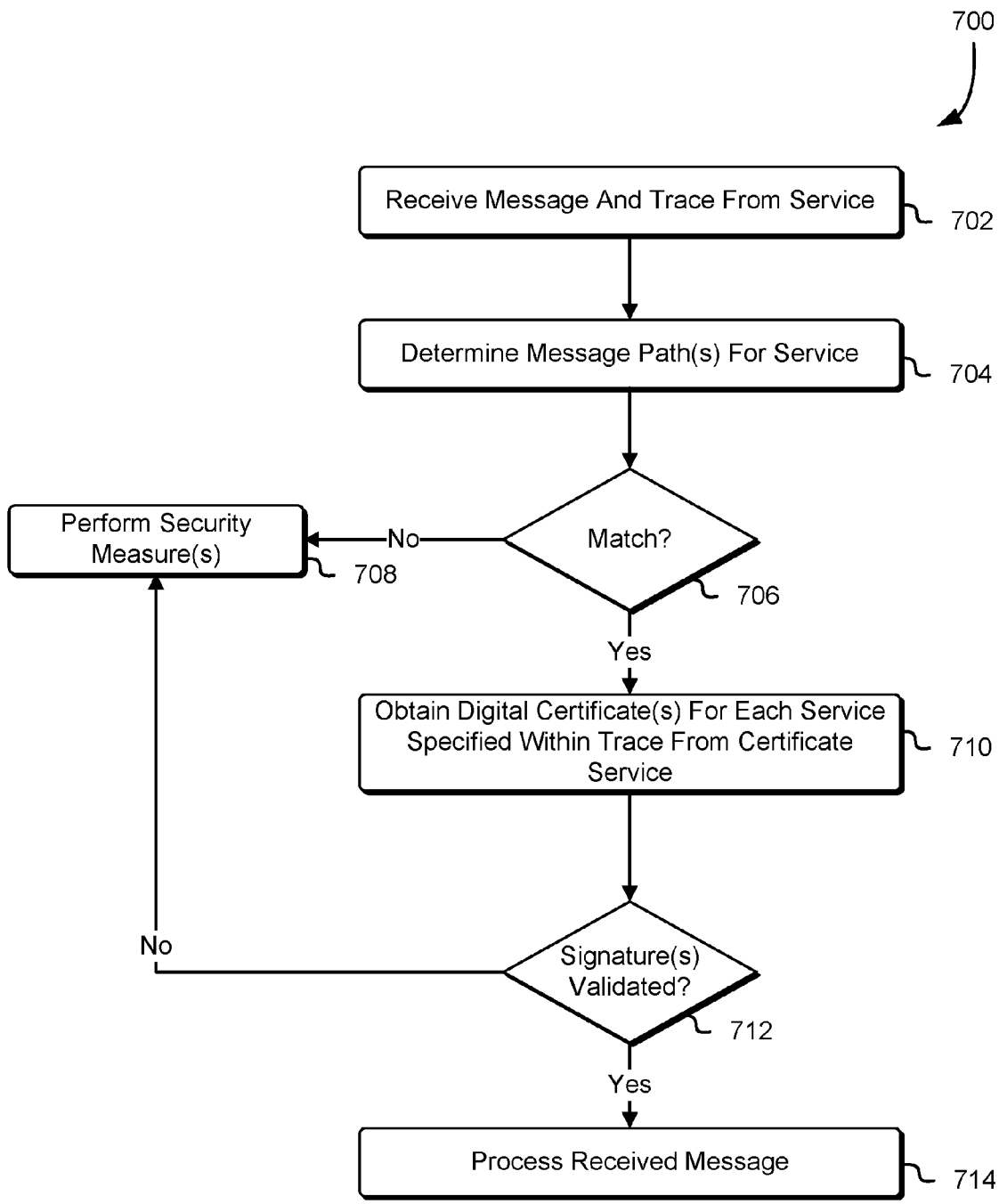
FIG. 7 shows an illustrative example of a process for validating a message and corresponding trace by utilizing one or more digital certificates obtained from a certificate service in accordance with at least one embodiment.

As noted above, instead of the message and trace including the digital certificates necessary to validate the one or more digital signatures of the one or more services along a message path, a recipient service may transmit a request to a certificate service to obtain these one or more digital certificates. This may obviate the need for any service along a message path to include, along with its digital signature, a corresponding digital certificate necessary for validating the digital signature. Accordingly, FIG. 7 shows an illustrative example of a process 700 for validating a message by utilizing one or more digital certificates obtained from a certificate service in accordance with at least one embodiment. The process 700 may be performed by the aforementioned recipient service, which may receive one or more messages and corresponding traces from myriad sending services along a message path. The recipient service may further be configured to communicate with a certificate service to obtain digital certificates for these myriad sending services as required.

Similar to the process described above in connection with FIG. 6, the recipient service may receive 702 a message and corresponding trace from a sending service and determine 704 the one or more message paths for the sending service. For instance, the recipient service may utilize one or more machine learning techniques to identify acceptable message paths related to the sending service. Alternatively, the one or more acceptable message paths for the sending service may be defined by an administrator or security service. The administrator may generate a database specifying each possible message path for each sending service within the network. This database may be stored within a service data repository of the recipient service, as illustrated in FIGS. 3 and 4.

Similar to the process described above in connection with FIG. 6, the recipient service may utilize these determined message paths for the sending service to determine 706 whether the message path specified within the trace metadata matches any of these determined message paths. If there is no match, the recipient service may perform 708 one or more security measures. However, if there is a match, the recipient service may transmit a request to a certificate service to obtain 710 one or more digital certificates for each service specified within the trace that has provided a digital signature. The recipient service may store these obtained one or more digital certificates within its cache for future use, obviating the need to submit requests to the certificate service each time a new message is received.

Once the recipient service has obtained the one or more digital certificates from the certificate service, the recipient service may utilize these digital certificates to determine 712 whether the one or more digital signatures included with the trace are valid. If any of the received digital signatures are not valid, the recipient service may perform 708 one or more security measures, as the received message and the sending service may be deemed to be suspicious. However, if the digital signatures included with the trace are deemed to be valid, the recipient service may process 714 the received message. For instance, as described above, the recipient service may transmit a response to the sending service. Alternatively, the recipient service may append the trace to include its own digital signature. Subsequently, the recipient service may transmit the newly modified message and appended trace to another recipient service, which may perform the process 700 locally and obtain the digital certificate corresponding to the recipient service's digital signature from the certificate service, as well as the digital certificate for all other services specified within the trace.

It should be noted that the process 700 may be performed in an alternative order based at least in part on the configuration of the recipient service. For instance, in some embodiments, the recipient service may be configured to obtain 710 one or more digital certificates for each digital signature included with the trace to determine 712 whether the one or more digital signatures included with the trace are valid. If any of these digital signatures are not valid, the recipient service may perform 708 one or more security measures without ever evaluating the trace itself to determine 704 the one or more message paths for the sending service. If the digital signatures are valid, then the recipient service may utilize the trace to determine 704 the one or more message paths for the sending service and determine 706 whether the message path specified within the trace metadata matches any of these determined message paths. In some embodiments, the recipient service may evaluate the digital signatures and the trace in parallel.

Figure 8:
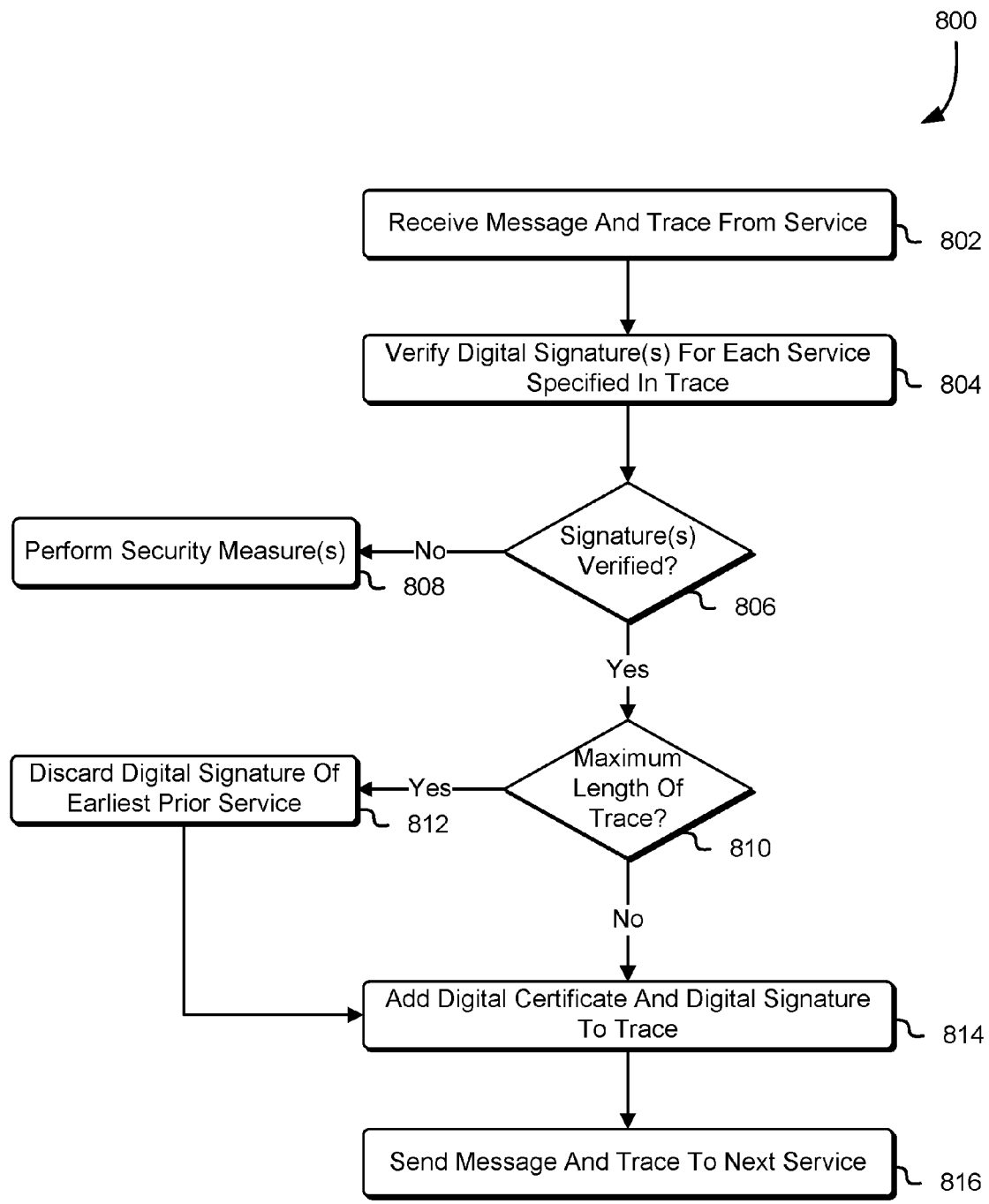
FIG. 8 shows an illustrative example of a process for appending a trace with a digital certificate and digitally signature to demonstrate a message path in accordance with at least one embodiment.

As noted above, each trace may include one or more digital signatures for each service along a message path. Additionally, for each digital signature, the trace may also include one or more digital certificates corresponding to the digital signature, which may enable a service to validate the digital signature and, by extension, the trace. In some embodiments, a service along a message path may discard any earlier digital signatures and corresponding digital certificates if the trace will exceed a defined maximum length as a result of the service adding its own digital signature and corresponding digital certificate to the trace. Accordingly, FIG. 8 shows an illustrative example of a process 800 for appending a message with a digital certificate and digitally signing the message to demonstrate a message path in accordance with at least one embodiment. The process 800 may be performed by any service along a particular message path. Each service may be configured to verify the digital signatures and corresponding digital certificates for any other service along the message path specified within the trace. Further, each service may be configured to append the trace with its own digital signature and corresponding digital certificate as needed.

A service along a message path may, at any point, receive 802 a message from another service along the message path. This other service may have been the last recipient of the message and has included, with the message, its digital signature and corresponding digital certificate. As noted above, each message and trace may include one or more digital signatures for each service along the message path. Further, the trace may include a digital certificate for each of the one or more digital signatures included therein. This may enable the recipient service to verify 804 the one or more digital signatures for each service specified within the metadata of the received message and in the trace. For instance, the recipient service may obtain, from a digital certificate, a public cryptographic key, which may be used to decrypt the corresponding digital signature of a service along the message path. If there is a mismatch between the decrypted signature data and the hash of the message, then the digital signature may not be valid. Alternatively, if there is no mismatch, the digital signature may be deemed to be valid.

The recipient service may utilize all digital certificates included within the trace to determine 806 whether the digital signatures may be verified. If there is at least one invalid digital signature within the trace, the recipient service may perform 808 one or more security measures, since the message and the sending service may be deemed suspicious. For instance, as described above in connection with FIGS. 5 and 6, the recipient service may alert an administrator or security service to further investigate the received message and the sending service to determine the nature of the anomaly. Additionally, or alternatively, the recipient service may block the IP address of the sending service to prevent further message transmissions from the sending service to the recipient service.

If the digital signatures within the trace are verified by the recipient service to be valid, the recipient service may determine 810 whether adding its own digital signature and corresponding digital certificate to the trace may result in the trace exceeding an established maximum length. For instance, each service along a message path may be configured to ensure that the message trace for a digital message does not exceed a particular number digital signature/digital certificate pairs. For example, if the maximum number of digital signature/digital certificate pairs that may be included within a trace is specified to be three, a service may discard any earlier pairs that may result in the maximum limit being exceeded when the service adds its own digital signature/digital certificate pair to the trace. Thus, if the recipient service determines that adding its digital signature/digital certificate pair to the trace may result in the maximum length limit of the trace to be exceeded, the recipient service may discard 812 the digital signature/digital certificate pair of the earlier prior service along the message path. While a maximum length limit is used extensively throughout the present disclosure, it should be noted that in some embodiments, there may be no maximum length limit for the trace. In such instances, the recipient service may not perform these steps of the process 800.

Once the recipient service has discard the digital signature/digital certificate pair as a result of determining that adding its own pair would exceed the maximum length limit of the trace or the recipient service determines that the maximum length of the trace will not be reached, the recipient service may add 814 its own digital certificate to the message and digitally sign the message and trace. Further, the recipient service may proceed to send 816 the updated message and trace to the next service along the message path. This may allow this next service to perform the process 800 and add its own digital certificate and digital signature to the message and trace.

Figure 9:
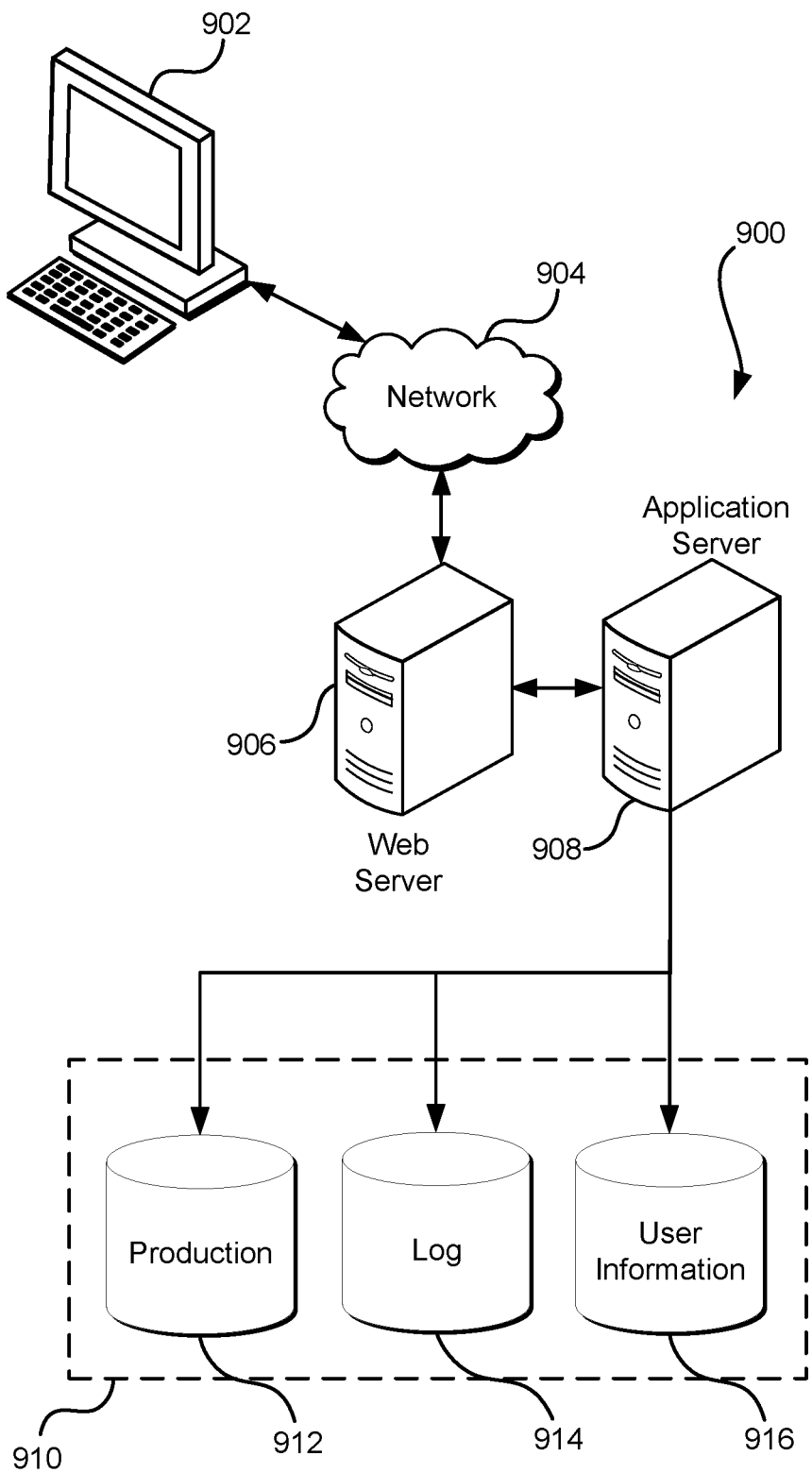
FIG. 9 shows an illustrative example of an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network, or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes, or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing, and retrieving data, which may include any combination and number of data servers, databases, data storage devices, and data storage media, in any standard, distributed, virtual, or clustered environment. The application server can include any appropriate hardware, software, and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video, and/or other content usable to be provided to the user, which may be served to the user by the web server in the form of HyperText Markup Language ("HTML"), Extensible Markup Language ("XML"), JavaScript, Cascading Style Sheets ("CSS"), or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML, or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis, or other such purposes. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices, or processing devices which can be used to operate any of a number of applications. User or client devices can include any of a number of general purpose personal computers, such as desktop, laptop, or tablet computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network. These devices also can include virtual devices such as virtual machines, hypervisors, and other virtual devices capable of communicating via a network.

Various embodiments of the present disclosure utilize at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, a satellite network, and any combination thereof.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C#, or C++, or any scripting language, such as Ruby, PHP, Perl, Python, or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising at least one computing device configured to implement one or more services, wherein the one or more services:
   receive, by at least one computing device, a digital message and a trace, the trace including an ordered set of a plurality of digital signatures of, and respectively added to the digital message by devices along a message path, including at least a first service and a second service and including information indicating that the first service and the second service together caused the digital message to be received;
   determine, by at least one computing device, if a message path specified within the trace corresponds to a recorded message path based at least in part on the ordered set of the plurality of digital signatures of the trace respectively added to the digital message by devices along the message path; and
   process the digital message by at least one computing device.

2. The system of claim 1, wherein:
   the information includes cryptographically verifiable information; and
   the one or more services are further configured to verify the cryptographically verifiable information.

3. The system of claim 2, wherein the one or more services are further configured to utilize one or more digital certificates corresponding to the cryptographically verifiable information to verify the cryptographically verifiable information.

4. The system of claim 3, wherein the one or more digital certificates are received with the digital message and the trace.

5. The system of claim 3, wherein the one or more services are further configured to obtain, from a certificate service, the one or more digital certificates to enable utilization of the one or more digital certificates to verify cryptographically verifiable information.

6. The system of claim 1, wherein the trace specifies an ordering of the first service and second service, the ordering according to an order of participation in causing the digital message to be received.

7. The system of claim 1, wherein:
   the digital message is of a particular type; and
   the one or more services are further configured to verify that the message path specified within the trace corresponds to one of a set of recorded message paths corresponding to the particular type to determine if the message path specified within the trace corresponds to the recorded message path.

8. The system of claim 1, wherein the one or more services are further configured to append, to the trace, a digital signature and transmit the digital message and the appended trace to another service upon processing the digital message.

9. A computer-implemented method, comprising:
receiving a digital message at one or more computing devices;
receiving, at one or more computing devices, a trace specifying at least a portion of a message path associated with the digital message that includes information indicating at least a first service and a second service that caused the digital message to be received, the first service being different than the second service, the trace including an ordered set of a plurality of digital signatures of, and respectively added to the digital message by devices along the message path;
determining, by one or more computing devices, if the message path specified by the trace corresponds to a recorded message path based at least in part on the ordered set of the plurality of digital signatures of the trace respectively added to the digital message by devices along the message path; and
processing, by one or more computing devices, the digital message based at least in part on determining that the message path specified by the trace corresponds to a recorded message path.

10. The method of claim 9, further comprising receiving cryptographically verifiable information that has been cryptographically verified by the first and second service by one or more digital certificates.

11. The method of claim 9, wherein the trace path further indicates a third service that caused the digital message to be received, the third service being different from the first and second service.

12. The method of claim 9, wherein the trace comprises a concatenation of a first digital signature that was added to the trace along the message path by the first service and a second digital signature that was added to the trace along the message path by the second service.

13. The method of claim 12, wherein the first digital signature comprises a first unique service identifier associated with the first service and a first timestamp and wherein the second digital signature comprises a second unique service identifier associated with the second service and a second timestamp that is different from the first timestamp.

14. The method of claim 9, further comprising determining, based at least in part on the trace, a plurality of potential communication paths that the digital message may have taken before receiving the digital message.

15. A non-transitory computer-readable storage medium having stored thereon executable instructions that, if executed by one or more processors of a computer system, cause the computer system to:
receive a first trace identifying at least a portion of a message path associated with a digital message, the first trace including information indicating at least a first service and a second service that comprise an origin of the message, the trace including an ordered set of a plurality of digital signatures of, and respectively added to the digital message by devices along the message path;
determine whether the message path identified by the first trace corresponds to a recorded message path based at least in part on the ordered set of the plurality of digital signatures of the trace respectively added to the digital message by devices along the message path; and
process the digital message.

16. The non-transitory computer-readable storage medium of claim 15, wherein processing the digital message comprises identifying the digital message as suspicious based at least in part on a determination that one or more digital signatures associated with the first trace are invalid.

17. The non-transitory computer-readable storage medium of claim 15, wherein processing the digital message comprises sending a digital message response to the first service that comprises a second trace indicating a plurality of services through which the digital message response has been processed to reach the first service.

18. The non-transitory computer-readable storage medium of claim 15, further comprising requesting a respective digital certificate for the first service and second service from a certificate service based at least in part on identifying the first service and second service from the first trace.

19. The non-transitory computer-readable storage medium of claim 15, wherein the first trace identifies fewer than a complete set of services that define a complete message path of the digital message, and wherein the determining whether the message path identified by the first trace corresponds to a recorded message path includes comparing a plurality of possible complete message paths of the digital message to a plurality of recorded message paths.

20. The non-transitory computer-readable storage medium of claim 15, wherein processing the digital message includes rejecting the message and performing one or more security measures based at least in part on a determination that the message path identified by the first trace does not correspond to a recorded message path.

* * * * *